US005782330A

United States Patent [19]

Mehlert et al.

[11] Patent Number: 5,782,330

[45] Date of Patent: Jul. 21, 1998

[54] INFORMATION DISPLAY AND CONTROL DEVICE FOR A PASSENGER CONVEYOR

[75] Inventors: Martin Mehlert, Nienstaedt; Michael Kruse, Minden; Dietmar Krüger, Rintein; Reiner Wallbaum, Bochum, all of Germany

[73] Assignee: Otis Elevator Company, Farmington, Conn.

[21] Appl. No.: 781,950

[22] Filed: Dec. 20, 1996

[51] Int. Cl.$^6$ .......... B65G 15/00

[52] U.S. Cl. .......... 198/324; 198/322

[58] Field of Search .......... 198/321, 322, 198/323, 324

[56] References Cited

U.S. PATENT DOCUMENTS 1,985,563 12/1934 Fitz Gerald .......... 198/322

4,223,609 9/1980 Montagner .......... 198/324 X

FOREIGN PATENT DOCUMENTS 2-127390 5/1990 Japan .......... 198/324

3-138292 6/1991 Japan .......... 198/324

*Primary Examiner*—James R. Bidwell

[57] ABSTRACT

An information display and control device for a passenger conveyor includes a housing and a post. The device is separate from the passenger conveyor and is positioned at a desirable location that is viewable by passengers approaching the passenger conveyor. The housing is mounted on the post at a predetermined height to avoid inadvertent tampering with the components of the housing. In one particular embodiment, the components of the housing include a traffic light, a control panel and an emergency switch.

6 Claims, 3 Drawing Sheets

FIG.3
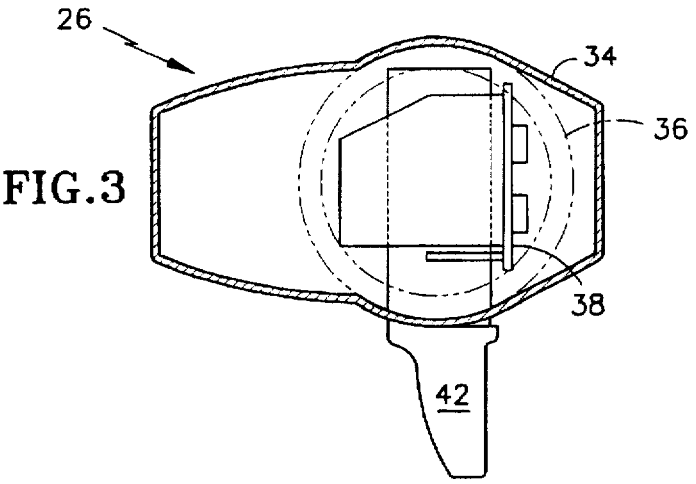
FIG.4
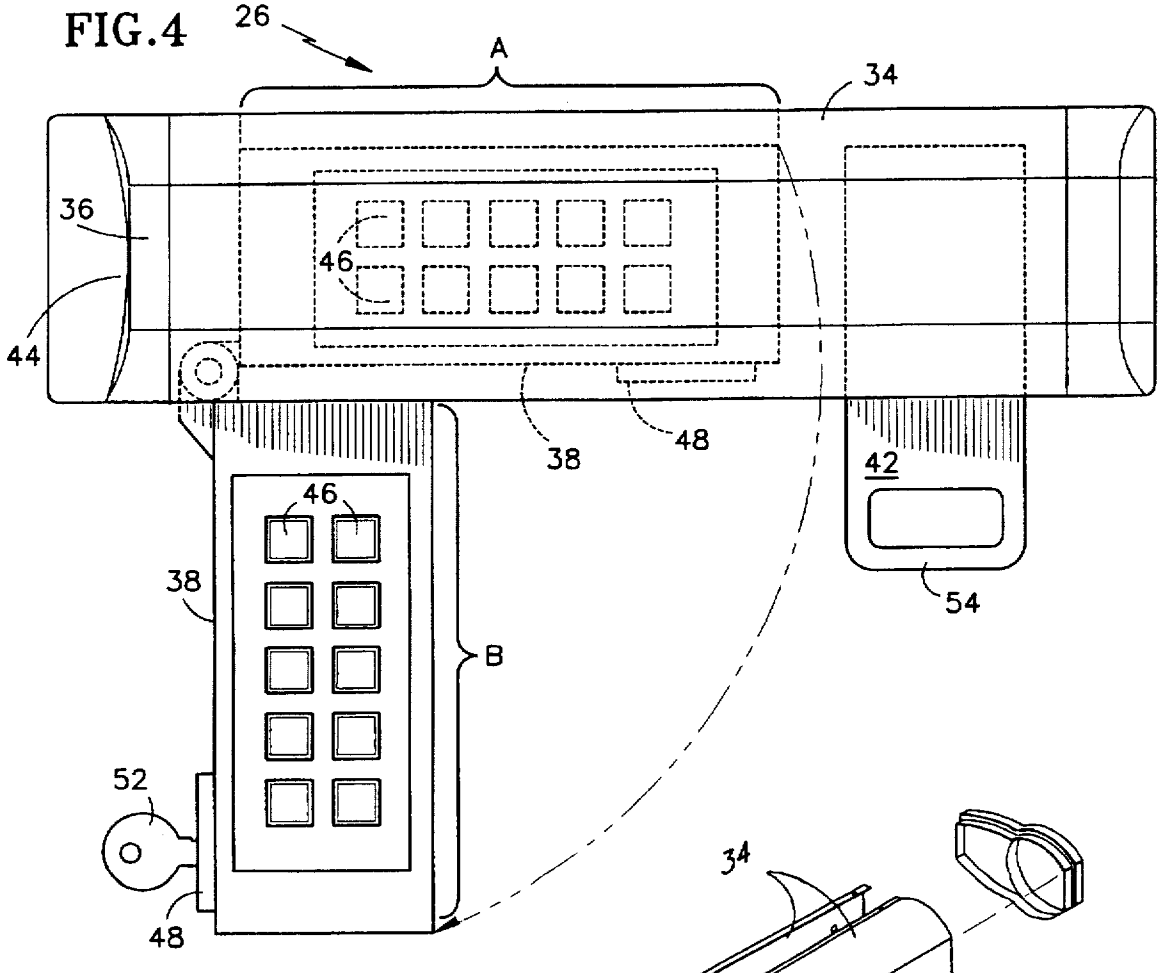
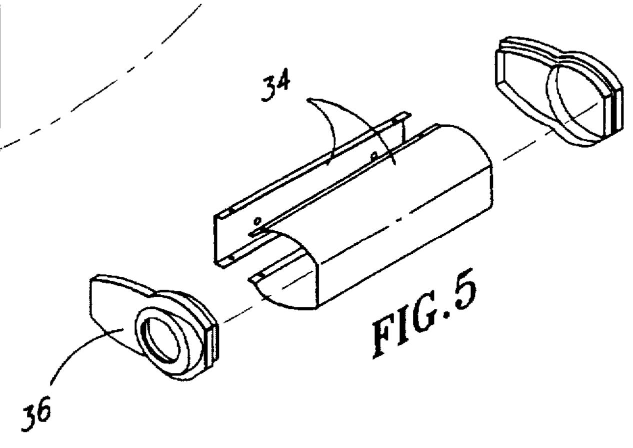
FIG.5

INFORMATION DISPLAY AND CONTROL DEVICE FOR A PASSENGER CONVEYOR

TECHNICAL FIELD

The present invention relates to passenger conveyors, such as escalators and moving walks, and more particularly to information displays and control devices for such conveyors.

BACKGROUND OF THE INVENTION

Passenger conveyors, such as escalators and moving walks, are very efficient means of transporting passengers between various landings. A typical conveyor includes a plurality of sequentially connected steps (escalator) or pallets (moving walk) that are driven through a closed loop path between two landings. Although in the most common application two conveyors are used, with one for each direction, at very busy sites numerous conveyors may be used. In addition, the direction of individual conveyors may be changed to accommodate different traffic flows throughout the day.

Recently, information displays have been added to conveyors in order to direct passengers to the appropriate conveyor. Such displays are mounted proximate to the conveyor and on the balustrade or frame. A drawback to this approach is that a passenger entering the conveyor may have to be close to the conveyor to view the information display, especially at a crowded site.

Aside from efficiency, another concern with passenger conveyors is safety. Many conveyors include an emergency switch that is mounted near the entrance and exit of each conveyor. These switches are typically mounted low to the ground. In the event that a foreign object, such as clothing or baggage, becomes lodged between the relatively moving surfaces of the conveyor, the emergency switch may be actuated to stop the conveyor and dislodge the foreign object. Unfortunately, the emergency switches are also located such that they may be inadvertently actuated by children.

Once the conveyor is stopped, a mechanic or operator is required to travel to the site to restart the conveyor. The visit to the site is necessary to ensure that the conveyor is not started while a passenger is on the conveyor. Unnecessary visits by the mechanic or operator increase the cost of operation of the conveyor and reduce the efficiency of the conveyor.

The above art notwithstanding, scientists and engineers under the direction of Applicants' Assignee are working to develop more efficiently operating passenger conveyors.

DISCLOSURE OF THE INVENTION

According to the present invention, an information display and control device for a passenger conveyor includes a housing mounted on a post and having a direction indicator, a control panel and an emergency switch. The post is located separately from the passenger conveyor and positions the housing at a predetermined height to discourage inadvertent actuation of the emergency switch.

The location of the display separately from the conveyor permits the display to be positioned such that approaching passengers may view the information prior to arriving at the conveyor. This position avoids the problems associated with crowds blocking the view of approaching passengers. In addition, the invention is applicable to both indoor and outdoor passenger conveyors. For outdoor applications, the separation between the conveyor and the device permits the device to be positioned more flexibly. The position of the post and the height of the emergency switch places the switch in a position where it is less likely to be inadvertently actuated. Removing the switch from its typical position near the floor prevents the switch from being actuated by the feet of passengers entering the conveyor, or by children playing near the conveyor. The height of the switch may be selected such that most children below a predetermined height may not reach the emergency switch.

In accordance with a particular embodiment, the control panel has a stored position and an open position. In the stored position, the control panel is not visible to passengers; in the open position, the control panel is exposed for manipulation by an operator of the conveyor. This configuration provides a safe, yet convenient location for the control panel. In a further particular embodiment, the control panel is locked when in the stored position for further safety.

In additional embodiments of the present invention, the housing includes various other devices, such as a camera for remote viewing of the conveyor and a passenger sensor to sense approaching passengers. The camera may be used to view the conveyor for security or to permit remote starting of the conveyor. Remote starting may be used to minimize the number of visits by mechanics to the conveyor. The passenger sensor may be used to improve the operational efficiency of the conveyor by minimizing the speed or stopping the escalator during periods when no passengers are approaching the conveyor.

"Passenger conveyor" or "conveyor" as used herein means devices that have one or more platforms, either steps, pallets or belts, that move through a closed loop path to transport passengers from a first landing to a second landing, such as escalators and moving walks.

The foregoing and other objects, features and advantages of the present invention become more apparent in light of the following detailed description of the exemplary embodiments thereof, as illustrated in the accompanying drawings.

FIGS. *2a* and *2b* are perspective views of the information display and control device with FIG. *2a* illustrating a two-prong post and FIG. *2b* illustrating a solid, glass post.

FIG. 3 is a sectional view of the information display and control device, taken along line 3—3 of FIG. 2.

FIG. 4 is a side view of the information display and control device, with a control panel shown in both a stored and open position.

FIG. 5 is an exploded view of an outer shell.

Figure 6:
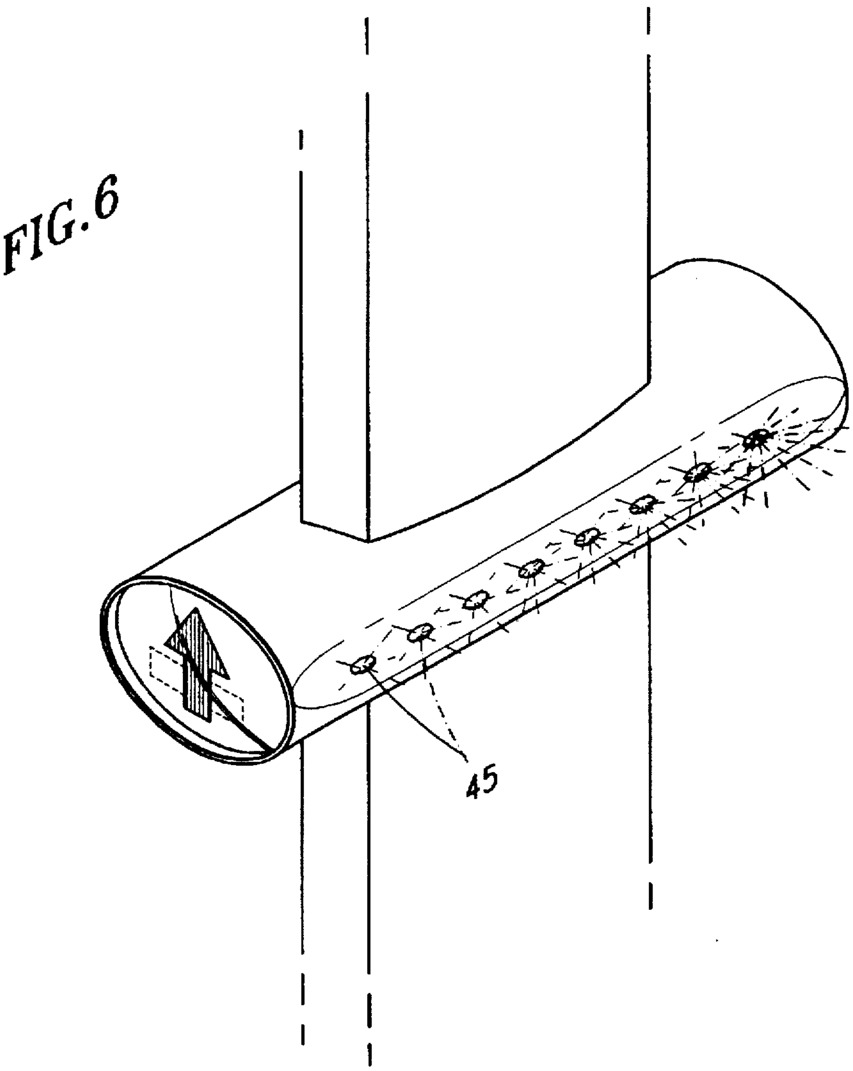

FIG. 6 is a perspective view of an alternative traffic light having sequentially flashing lights.

BEST MODE FOR CARRYING OUT THE INVENTION

Figures 1, 2A, 2B:
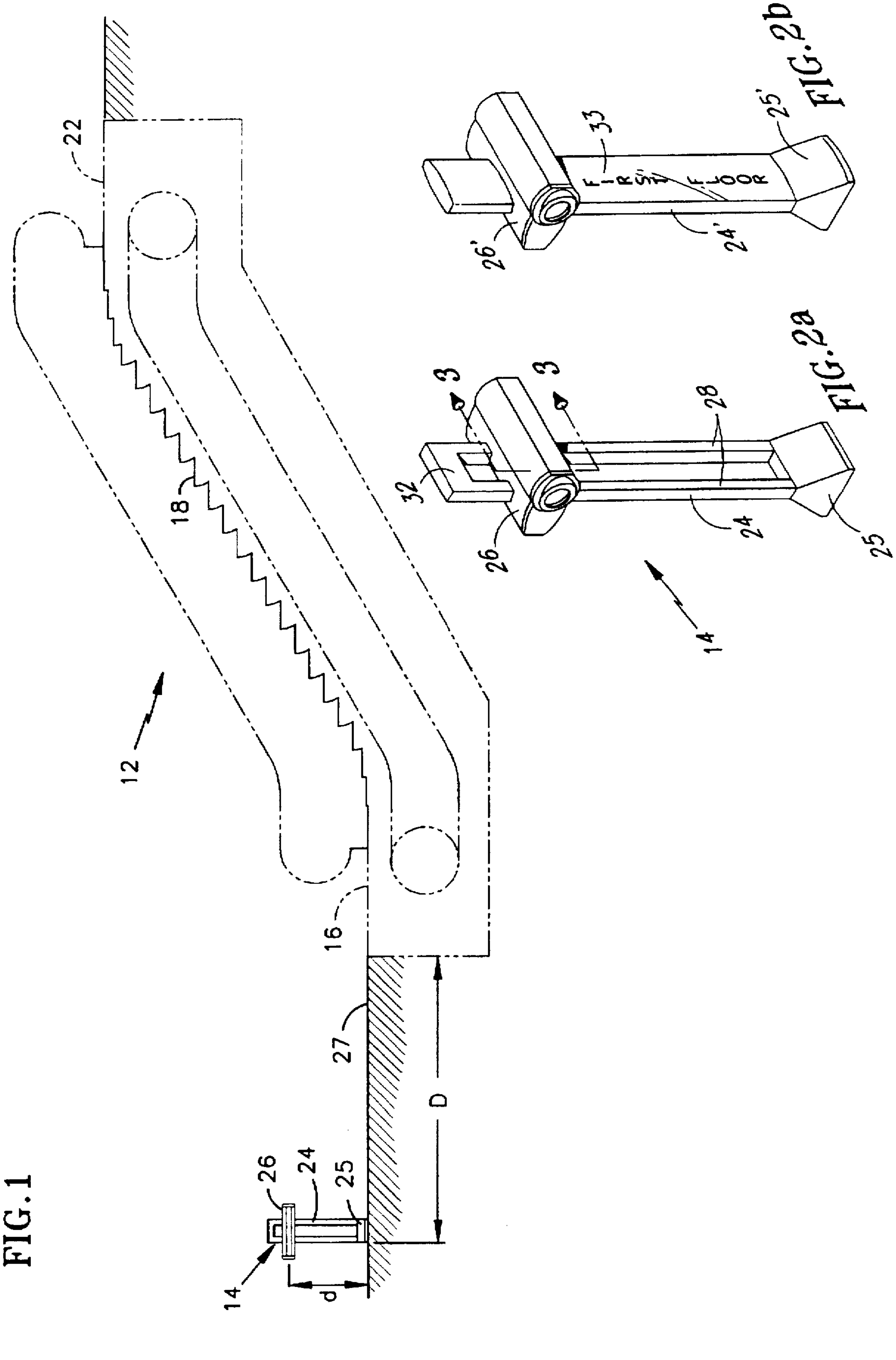
FIG. 1 is a side view of an escalator having an information display and control device.

Illustrated schematically in FIG. 1 is an escalator 12 having an information display and control device 14. The device 14 is mounted in front of a lower landing 16 of the escalator 12 such that passengers may view the device 14 as they approach the lower landing 16 to enter the escalator 12. Once passengers have entered the escalator 12, they are carried by a plurality of steps 18 up to the upper landing 22. A second information display and control device (not shown) may be positioned proximate to the upper landing so that it may be viewed by passengers approaching the upper landing 22. The escalator 12 shown in FIG. 1 is an exemplary representation of a passenger conveyor. The device 14 is equally applicable to other types of passenger conveyors, such as moving walks.

The device 14, as shown more clearly in FIG. 2, is not integral to the escalator 12 frame, which permits the device 14 to be located in a variety of locations, as desired by the operator or building owner. As shown in FIG. 1, the device 14 is located a distance D forward of the entrance to the escalator 12. The amount of distance D is dependent upon the particular location and application of the escalator 12. The height of the device 14 is selected such that it is at an appropriate height to be viewed by approaching passengers and high enough to avoid inadvertent tampering by small children.

The device 14 include a post 24 mounted on a base 25, and a housing 26 mounted on the post 24. The post 24 provides means to position the housing 26 at the desired height. The post 24 illustrated in FIG. 1 extends upward from the floor 27, although it may also extend from any other convenient surface, such as the ceiling, in order to position the housing 26 at the desired height. As shown in FIG. 2*a*, the post 24 includes two prongs 28 and a cross-member 32 interconnecting the prongs 28. Cabling (not shown) for the components of the housing 26 are enclosed by the prongs 28. Although the post 26 is shown as two prongs connected by a cross-member, the particular design of the post is primarily driven by aesthetic reasons. Alternative designs may include solid posts of various shapes, as shown in FIG. 2*b*. The post 24 may be fabricated from glass, steel, aluminum or any other readily available structural material. If the post is fabricated from laminated safety glass, pictograms 33 may be incorporated between the laminations, as shown in FIG. 2*b*. This location makes the pictograms, and the information contained in the pictogram, vandalism resistant.

The housing 26 is shown more clearly in FIGS. 3 and 4. The housing includes an outer shell 34, a traffic light 36, a control panel 38, and an emergency switch 42. The housing 26 is fixed to the post 24 in a conventional manner, such as by fasteners (not shown). The outer shell 34, as shown in an exploded view in FIG. 5, defines the outer surface for the housing 26 and is fabricated from extruded aluminum, although other materials and manufacturing processes may be used to make the shell 34.

The traffic light 36, shown in phantom line in FIG. 3, faces toward the approaching passenger traffic. The traffic light 36 includes a display 44 having markings to indicate the operational status of the escalator 12. For instance, the traffic light 36 may include a red colored horizontal line and a green arrow. The horizontal line is used to indicate that the escalator 12 is operating in a direction opposite to the passengers approaching the face of the traffic light 36, or that the escalator 12 has been stopped. The green arrow is used to indicate that the escalator 12 is operating and the direction of operation of the escalator 12. It should be noted that the traffic light is essentially a means to display information. It may be made larger than shown in FIGS. 1–4 in order to display further information regarding the escalator, or other information of interest to passengers. In addition, other types of traffic lights may be incorporated into the housing. One example is shown in FIG. 6. In this embodiment, the housing includes sequentially flashing lights 45 that extend along the side of the housing. The direction of the sequence indicates the direction of travel of the escalator.

The control panel 38 is mounted in a pivoting manner within the housing 26. The control panel 38 includes a plurality of buttons 46 that, when actuated, control the operation of the escalator 12. For instance, from the control panel 38 an operator may start and stop the escalator 12, change the direction of the escalator 12, or change the mode of operation of the escalator 12 from continuous to intermittent. The pivoting type mounting of the control panel 38 permits the panel 38 to be rotated up into the housing (stored position, identified A in FIG. 3) such that it is hidden from view of the passengers. For additional safety, the control panel 38 is provided with a key lock 48 to prevent unauthorized tampering with the operation of the escalator 12. To manipulate the control panel 38, the key 52 is engaged in the lock 48 and the control panel 38 is rotated clockwise into the open position (identified B in FIG. 3). From the open position, the various buttons 46 of the control panel 38 may be manipulated.

The emergency switch 42 is disposed within the housing 26 and includes a handle 54. The emergency switch 42 is electrically connected to the machine of the escalator 12 and, upon actuation of the switch 42, the operation of the escalator 12 is shut down. The emergency switch 12 is actuated by grasping the handle 54 and pulling down. As a result of the housing 26 being positioned at a height d relative to the floor, inadvertent actuation of the emergency switch 42, such as by an accidental kicking by passengers or by small children playing around the switch 42, is avoided. Locating the switch 42 in an open, accessible area near the escalator 12 facilitates actuation of the switch 42 in the event of an emergency situation.

Although the information and display device is shown and disclosed as containing a traffic light, control panel and emergency switch, it may also contain other useful devices. One example is a video camera that is directed at the escalator. The output of the video camera may be sent to a remote location such a as the operator's office. In this configuration, the operator may be able to view the escalator to discern if any passengers are present, and to start the escalator. In addition, the output of the video camera may be sent to a security office to permit surveillance of the escalator. Another alternative is to place a passenger detection sensor in the housing. In this configuration, approaching passengers would trigger the sensor and the escalator would be switched from stand-by operation to full speed operation.

The embodiment shown in FIGS. 1–4 includes a single housing on the post. As a further alternative, a single post may include two or more housings as desired.

Although the invention has been shown and described with respect to exemplary embodiments thereof, it should be understood by those skilled in the art that various changes, omissions, and additions may be made thereto, without departing from the spirit and scope of the invention.

We claim:

1. An integrated information display and control device for a passenger conveyor, the passenger conveyor having a direction of travel for carrying passengers from a first landing to a second landing, wherein the device is separate from the passenger conveyor and includes:

a housing including:

an information display that is viewable by the passengers approaching the passenger conveyor;

a control panel that permits an operator of the control panel to manipulate the operation of the passenger conveyor; and an emergency switch, wherein actuation of the switch stops the operation of the passenger conveyor; and a post that supports the housing such that the housing is positioned at a predetermined height to discourage inadvertent actuation of the emergency switch.

2. The device according to claim 1, wherein the control panel has a stored position and an open position, wherein in the stored position the control panel is not visible to passengers, and wherein in the open position the control panel is exposed for manipulation by the operator.

3. The device according to claim 2, wherein the housing further includes a lock, and wherein the lock may be actuated with the control panel in the stored position to prevent unauthorized access to the control panel.

4. The device according to claim 1, further including a camera that permits remote viewing of the passenger conveyor.

5. The device according to claim 1, further including a sensor for detecting passengers entering the passenger conveyor.

6. The device according to claim 1, wherein the information display includes a direction indicator that displays the direction of travel of the passenger conveyor to the passengers approaching the passenger conveyor.

* * * * *